(No Model.) 5 Sheets—Sheet 1.
C. O. BARTLETT.
CARBON TRIMMING MACHINE.
No. 500,553. Patented July 4, 1893.
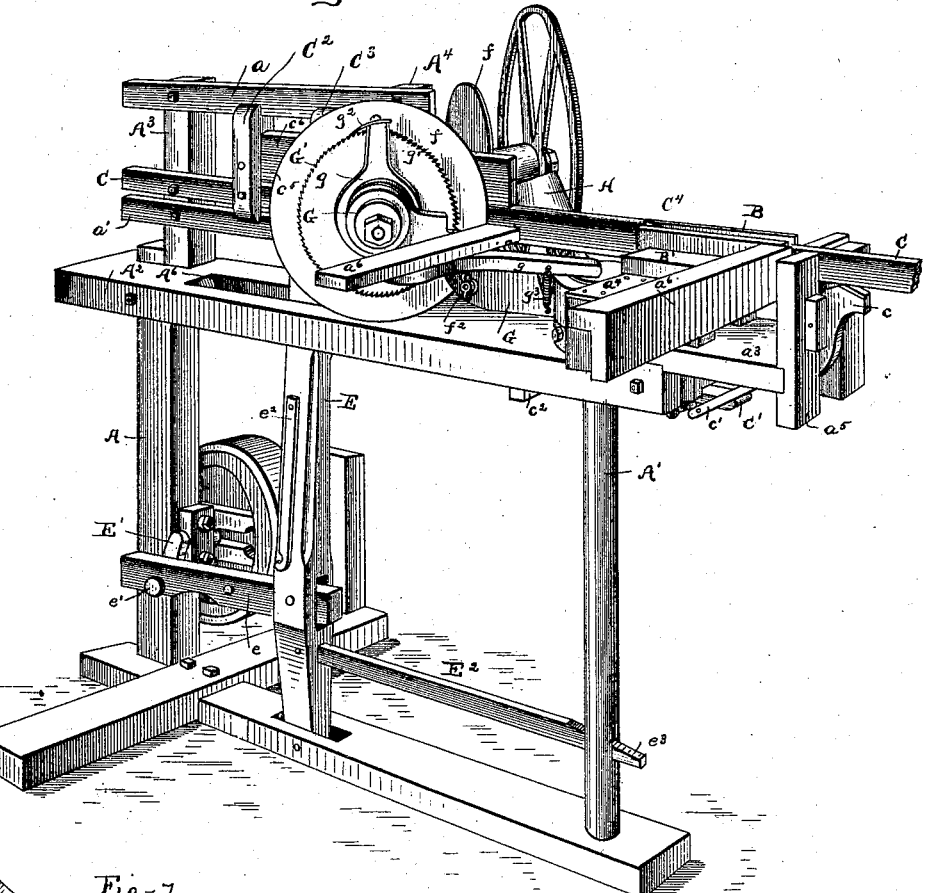
Fig-1-
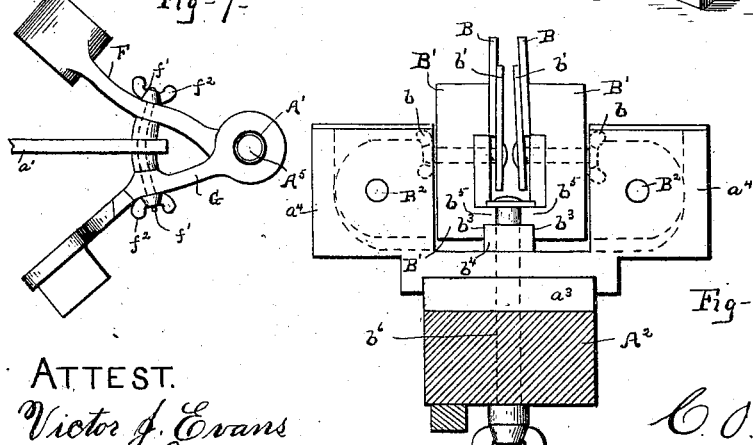
Fig-7-  Fig-6-
ATTEST.
Victor J. Evans
N. H. Fay
INVENTOR
C. O. Bartlett
By Hall and Fay
his attys.

(No Model.) 5 Sheets—Sheet 2.
C. O. BARTLETT.
CARBON TRIMMING MACHINE.
No. 500,553. Patented July 4, 1893.
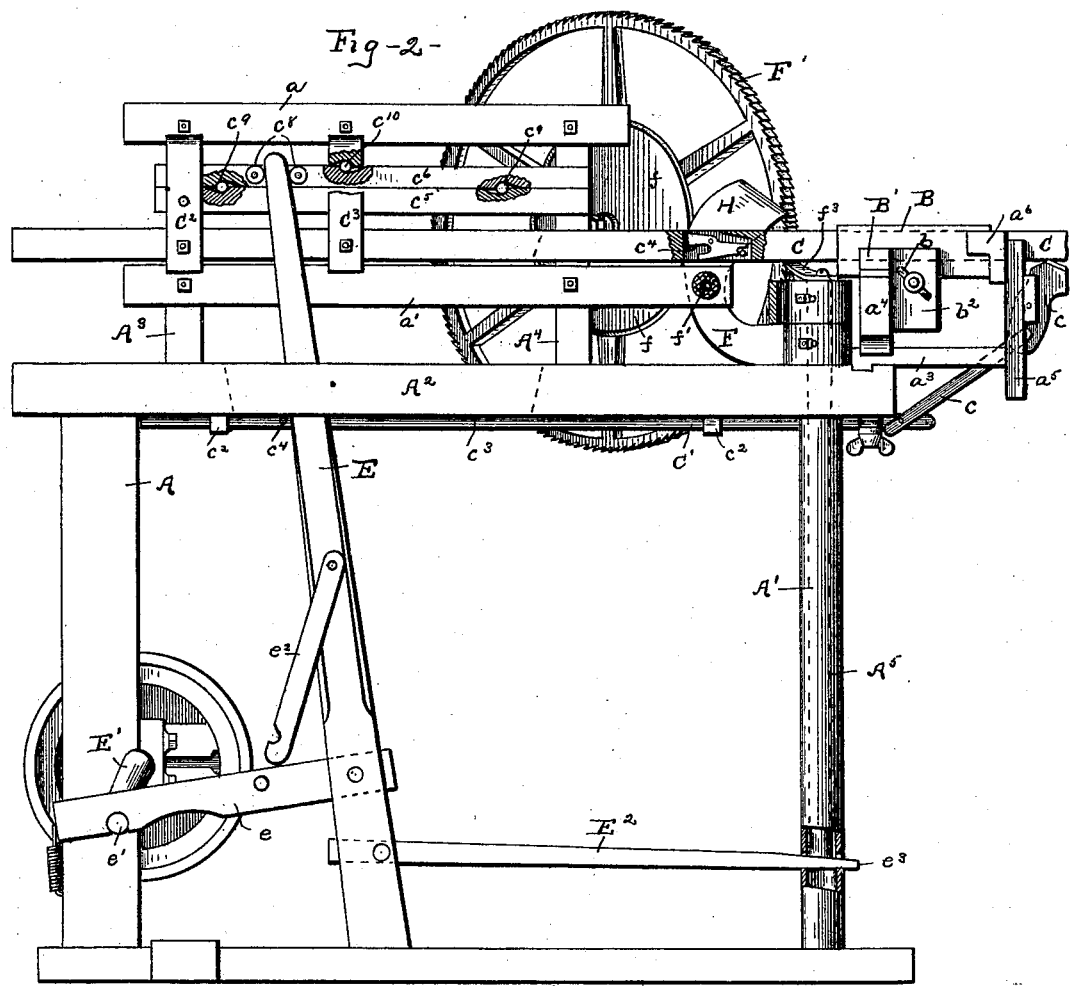
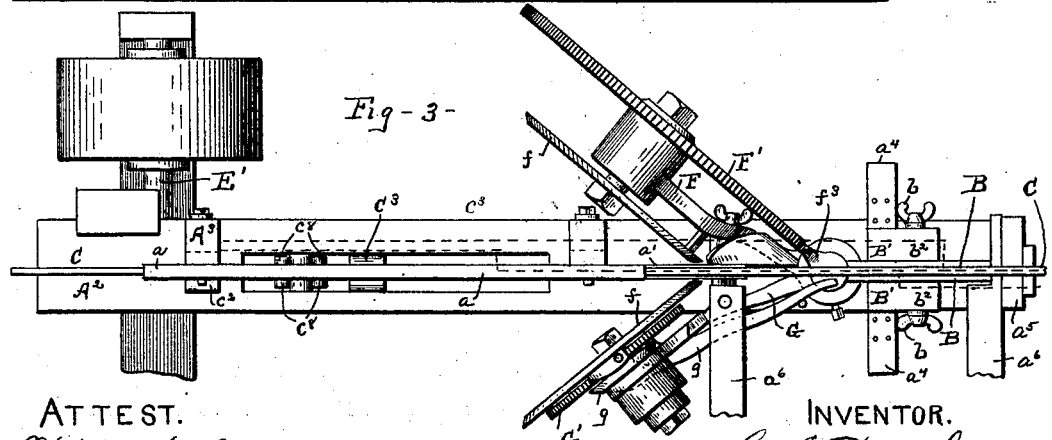
ATTEST.
Victor J. Evans.
N. H. Fay.
INVENTOR.
C. O. Bartlett
By Hall and Fay his attys.

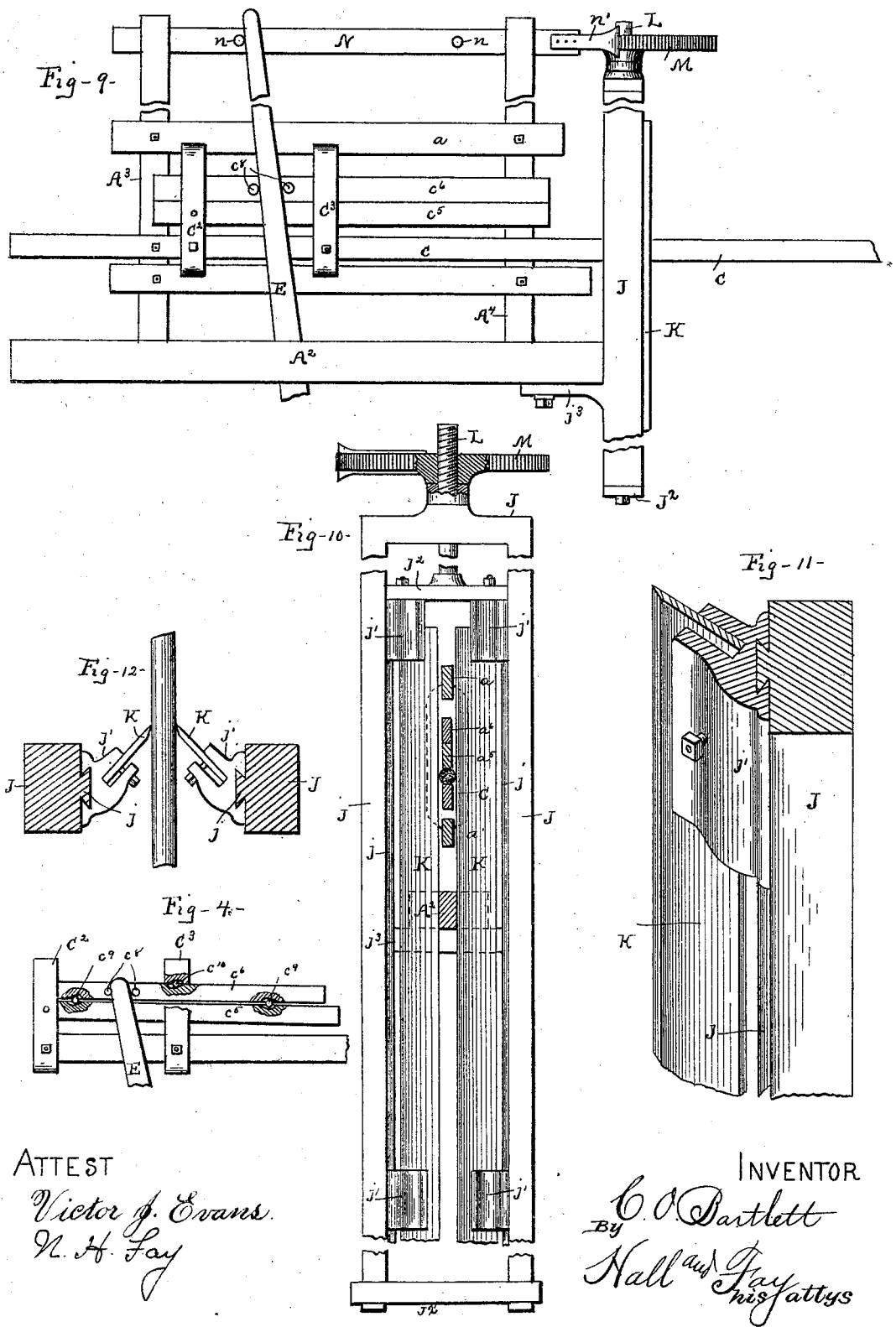

(No Model.) 5 Sheets—Sheet 4.
C. O. BARTLETT.
CARBON TRIMMING MACHINE.
No. 500,553. Patented July 4, 1893.
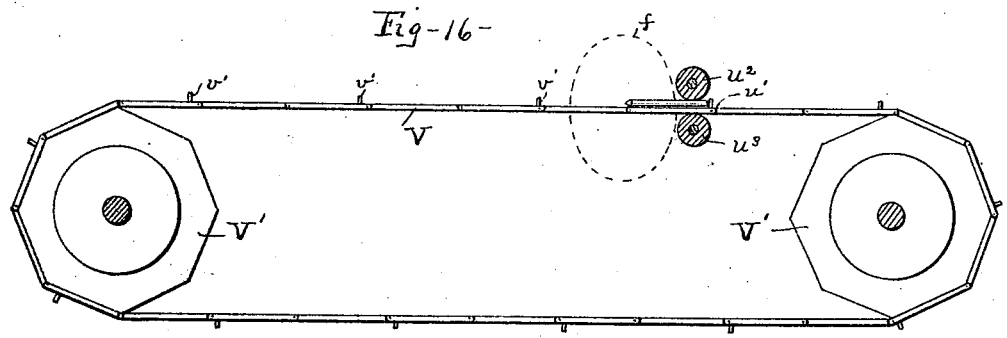
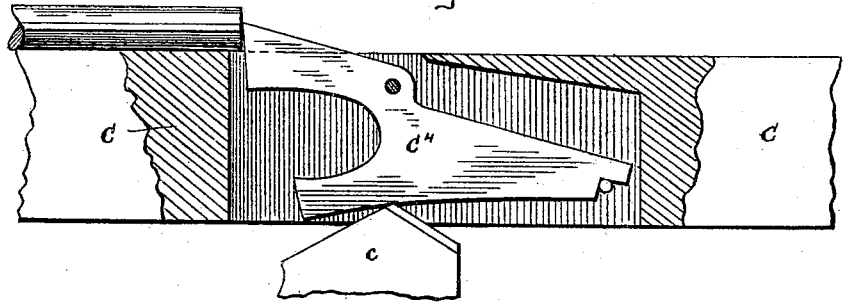
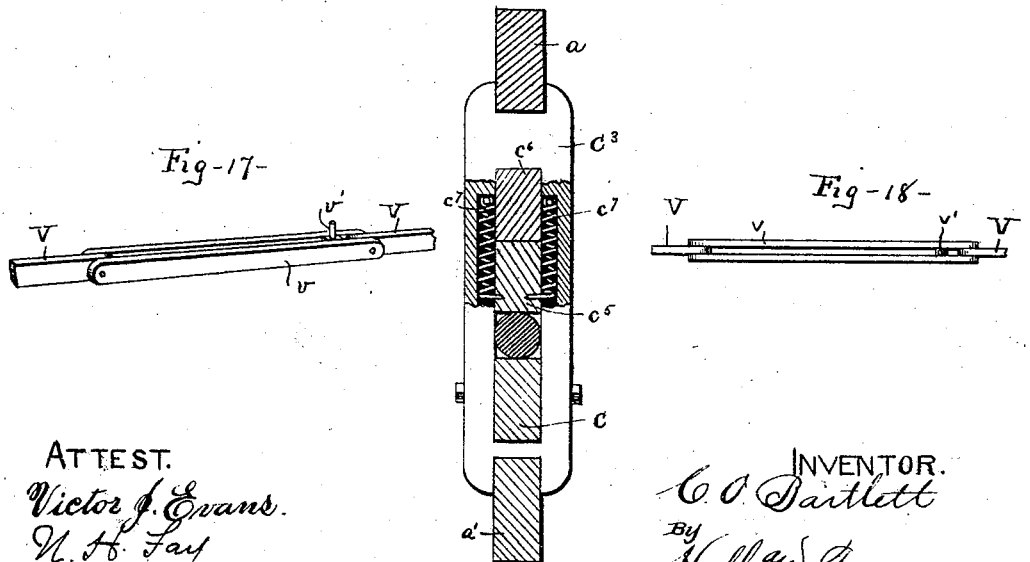

(No Model.) 5 Sheets—Sheet 5.
C. O. BARTLETT.
CARBON TRIMMING MACHINE.
No. 500,553. Patented July 4, 1893.
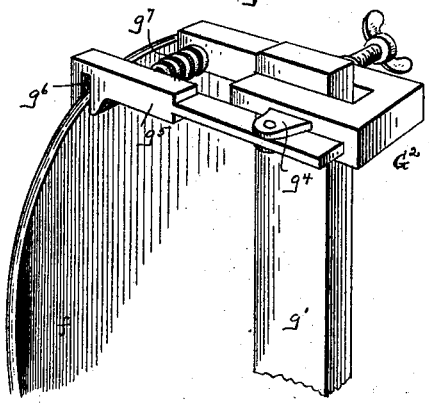
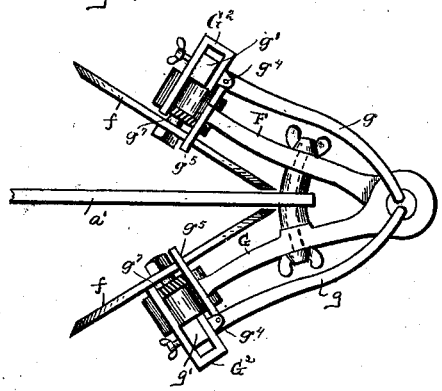
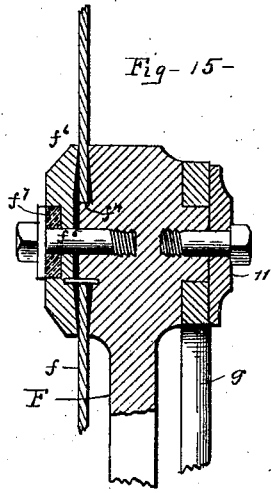

UNITED STATES PATENT OFFICE.

CHARLES O. BARTLETT, OF CLEVELAND, OHIO.

CARBON-TRIMMING MACHINE.

SPECIFICATION forming part of Letters Patent No. 500,553, dated July 4, 1893.

Application filed August 8, 1890. Serial No. 361,422. (No model.)

*To all whom it may concern:*

Be it known that I, CHARLES O. BARTLETT, a citizen of the United States, and a resident of Cleveland, county of Cuyahoga, and State of Ohio, have invented certain new and useful Improvements in Carbon-Trimming Machines, of which the following is a specification, the principle of the invention being herein explained and the best mode in which I have contemplated applying that principle, so as to distinguish it from other inventions.

My invention relates to improvements in carbon trimming machines and more especially refers to the severing from a plate of web joined carbons, a complete carbon, and in means for carrying the severed carbon, in operative relation to suitably disposed knives contiguous to the path of the carbon carrier; and to mechanism whereby the knives are moved, so as to present a new cutting surface to the subsequent carbons. These knives are so arranged that a new surface is presented for each carbon passing, that is, no two following carbons will be trimmed by the same surface of the knives. The object of this provision is to prolong the life of the knives as well as to insure a clean cutting away of the "fin," or that portion of the joining web yet remaining on its sides; and this is accomplished by the mechanism hereinafter described and pointed out in the claims.

Referring to the drawings: Figure 1 is a perspective view of the device looking from in front of the machine. Fig. 2 Sheet 2, is a side elevation, showing one of the knives with a portion of its support removed to disclose the construction beyond. This view also shows certain portions broken away to more clearly show the invention. Fig. 3, Sheet 2, is a plan view of the machine. Fig. 4, Sheet 3, is a side elevation showing the gripping mechanism in an operative position, opposite to that shown in Fig. 2. Fig. 5, Sheet 4, is an enlarged elevation in section of a portion of the carbon carrier, disclosing the pushing pawl. Fig. 6, Sheet 1, is a transverse sectional elevation looking toward the right hand end of the machine and against the ends of the carbon carrier guides. Fig. 7 is a detached plan view of the two knife supporting arms, showing the yielding connections between them. Fig. 8, Sheet 4, is a transverse sectional elevation of the gripping mechanism. Fig. 9, Sheet 3, is a side elevation of a modified application of a straight up and down knife, showing how the same is fed by the movement of the carbon carrier. Fig. 10 is an enlarged transverse elevation of the straight knives and their supports as well as the feed connections. Fig. 11 is an enlarged sectional perspective showing a knife, its supporting slide and the guide way for the slide. Fig. 12 is an enlarged detached plan view showing the straight knives as being operative upon a passing carbon. Figs. 13, 14 and 15 illustrate my preferred form of feeding mechanism in which Fig. 13 is a perspective view thereof; Fig. 14 a plan view, and Fig. 15 being a section through the knife bearing. Fig. 16, Sheet 4, is a diagrammatic side elevation showing a modified carbon carrier. Fig. 17 is a perspective view showing a portion of the carbon carrier shown in Fig. 16. Fig. 18 is a plan view of the same.

In Figs. 1 and 2, I have shown my device as composed of a base or bed plate, having supporting standards A A' which hold, in an elevated position, the bed $A^2$ of the machine proper. From this bed, at its left hand end, is placed a standard $A^3$ and about midway of its ends is a similar standard $A^4$. These two standards serve to support an upper and a lower guide bar $a$ $a'$.

At the right hand end of the bed $A^2$ is provided a support $a^3$ and above it a second standard $a^4$ serving to hold the carbon carrier guide plates B. The first support $a^3$ at its outer end holds a projecting post $a^5$ which in turn forms a support for one of the supporting arms $a^6$. The standard $a^4$ carries jaws B' which have a side extension $b^2$; this extension is provided with thumb screws $b$ and clamping plates $b'$ (see Fig. 6). The jaws B' are pivoted at $B^2$ in the standard $a^4$ and their lower edges have recesses $b^3$ which rest upon a cushioning block $b^4$. Upward from these recesses are formed toes $b^5$, which rest upon the cushioning block $b^4$ and are so held by adjustable means, comprising a washer large enough to reach across the space between the toes $b^5$ and rest upon them, and accommodate a bolt $b^6$, whose head bears against the said washer from above, and passes down through the block $b^4$, the support $a^3$, and standard $a^4$ as well as the base $A^2$. Upon the under side of the base $A^2$, the bolt $b^6$ is provided with an adjusting screw which allows the guide plates B to move toward and from each other. The standard $a^5$ has pivotally connected therein, a rock arm or block $c$, the upper end of which has bearing against the under side of carbon carrier C. The block $c$ is connected by a link $c'$ to a reciprocating rod $C'$ moving under the bed $A^2$, being held in ways $c^2$ and having a ledge $c^3$ midway of its ends; and near its other end a pin $c^4$.

The carbon carrier C has secured to it, two cross heads, $C^2$ $C^3$ which slide upon the guide bars $a$ $a'$. These cross heads are slotted and they receive therein a little distance above the carrier C, two parallel bars or grippers $c^5$ $c^6$. The bar $c^5$ is pivoted in the cross head $C^2$ and in cross head $C^3$ is provided a set of coil springs $c^7$ (see Fig. 8) which are placed in suitable recesses of the cross head and are suspended therein from pins, while their lower ends project into holes of the bar $c^5$ and thus serve to hold up the said bar as well as the bar $c^6$ also. The bar $c^5$ at its right hand end, grips the carbon as it is fed upon the carrier C and in conjunction with the pushing pawl $C^4$ draws the carbon between knives $f$ which trim off the "fin" and make a complete product. This gripping is accomplished by the co-operation of the following members. The bar $c^6$ is free to slide in the cross heads $C^2$ $C^3$ as directed by the main actuating arm E which is connected thereto, as between two rollers $c^8$, one upon each of its sides.

The rock arm E has its lower end, pivotally mounted in the bed plate of the machine, and some distance above has mounted thereon a connecting rod $e$ which connects with a crank $e'$ on the driving shaft $E'$. The crank $e'$ has bearing in a slot of the connecting rod $e$ which allows the easy disengagement of the parts. A spring extends from the end of the connecting rod to the standard A and thus insures the remaining in operative relation of the parts $e$ $e'$ when the rod $e$ is not disengaged therefrom by a supporting link $e^2$ of the arm E. This link has a slot in which a pin of the rod $e$ may be seated and thus hold the mechanism of the machine inoperative. This exact form, is however, not essential as the means by which this may be accomplished are great in number.

Below the point where the rod $e$ and the arm E pivotally connect with each other, is secured in a similar manner, a link $E^2$ whose end $e^3$ is beveled and the same passes through a slot of the hollow standard $A'$. Above the end $e^3$ of link $E^2$ and within the standard $A'$ is placed a thrust rod $A^5$, which moves upward as the link $E^2$ is moved toward the right hand of the machine; and when moving in the reverse direction the rod $A^5$ drops by gravity, the upward movement being caused by the inclined end $e^3$. The standard $A'$ passes up through the base $A^2$ and to some distance beyond where it forms the pivotal point for the knife supporting arms F, G.

These arms have slight movement, horizontally upon the upper end of the standard $A'$. At their outer ends, which are some distance apart, are suitable bearings for the knives $f$ and about midway of their ends are holes through which, and through the guide bar $a'$, passes a bolt $f'$ threaded at both ends to receive thumb nuts $f^2$ which serve to hold these arms away from each other or draw them nearer together.

Between the arms F G and the guide bar $a'$ are placed elastic washers, encircling the bolts $f'$ one on each side of the bar $a'$, thus serving to make a yielding connection of said parts.

Upon the supporting arms F G at their free ends are bearings for the trimmer knives $f$ (see Figs. 14 and 15). The knives are secured upon an arbor $f^4$, being held in place by a tap screw $f^5$ which holds against the knife $f$ a washer $f^6$. This washer upon its outside has a recess for the cushioning block $f^7$. This block allows of a limited amount of elasticity to the knives and yet holds them firmly against any sidewise movement, though permitting the knife disks to be intermittently revolved in one direction only by reason of the tension of the washer $f^6$, being greater than the back movement of the feeding mechanism. The construction just referred to is the same in the case of either of the arms F or G they being duplicates of each other.

Upon the bearings opposite the knives are pivotally mounted oscillating feed arms $g'$. These arms have a forward extension $g$ which reaches over the thrust rod $A^5$, and are thus actuated thereby. The upper end of the feed arm $g'$ has mounted thereon a slotted block $G^2$ which is adjustably secured thereto by a thumbscrew. This block has ears $g^4$ in which is pivoted a slotted clamping pawl $g^5$ which has a slot $g^6$ of about the same cross section as that of the knife $f$. A spring $g^7$ is held between the pawl $g^5$ and an extension of the block $G^2$ and serves to keep the pawl $g^5$ inoperative on the back stroke of the arm $g'$. As the arm $g'$ moves forward, the pawl, by reason of the resistance between the knife in its slot will begin to "lag" and in so doing the planes of the side walls of the slot becoming angular to the sides of the knife, the latter will be clamped, and drawn forward when the pawl has completed its forward movement, the resistance of the pawl to the knife passing in its slot being uniform, and on the back stroke the tension of the knife in its bearings being greater, it is not again drawn back; but it is intermittently moved forward, as recited.

I have provided a modification of the feeding mechanism just described, the operation of which is set forth as follows: In the bearing of the arm F, upon the inner side, is placed the circular knife $f$ with its beveling face inward. This knife is mounted on a spindle, the other end of which has mounted thereon the toothed feed wheel $F'$. The feed wheel $F'$ is moved intermittently by a spring pawl $f^3$ mounted at the upper end of the thrust rod $A^5$, and as the rod alternately moves up and down carrying with it the pawl, it moves the feed wheel F'. The bearing of the arm G has a pin which carries the other circular knife $f$, and contiguous to it and secured thereto, the feed disk G'. Just outside of the ratchet toothed disk G' is an oscillating arm $g$ which has bearing upon the supporting pin of the knife F and disk G'. This arm has an upwardly projecting standard $g'$ which carries a spring pawl $g^2$. The long horizontal end of the arm $g$ terminates above the thrust rod $A^5$, being held thereon by a tension spring $g^3$. As the rod $A^5$ is reciprocated the arm $g$ is oscillated and the feed disk G' is caused to rotate, thus bringing a new cutting surface of the knife into action as another carbon is carried through. The carbons as placed upon the supporting arms $a^6$ are parallel to each other and joined by a thin web which serves to hold them together while being molded and subsequently facilitating the handling in trimming the carbons. This sheet rests upon the arms $a^6$ parallel with the line of movement of the carrier C. The operator, by hand moves the plate forward against the shield or stop H which leaves the forward carbon directly above the carrier C, as between the trimmers and the gravitating pawl or stop $C^4$. Just as the carrier C starts to move toward the left of the machine, to carry the carbon adjacent to the trimmers, the knife $f$ of the supporting arm G enters as between the carbon, lying upon the carrier C, and its contiguous member, yet connected thereto by a thin web. The entering of the knife $f$ between the two carbons splits them apart, the pawl $C^4$ in the meantime receiving the thrust of this operation. When severed, the carbon has upon its sides a small "fin" which must be trimmed off in order to make the product marketable. A shield or stop H is secured between one of the elastic washers, on the bolt $f'$ and the guide bar $a'$. This plate projects up beyond the carbon carrier C and serves to keep a detached carbon from falling off the carrier before it is grasped by gripping bar $c^5$.

The gripping of the carbon is accomplished as follows: When the carbon is detached from its companion, its one end is just forward of the knives $f$. That is, just as the carrier is starting on its operative movement toward the left of the machine (when in the above position) the carbon is clamped between the carrier C and the bar $a^5$, by reason of the movement of the arm E upon the bar $c^6$. As the arm E begins to move in the left hand direction of movement, it first carries the bar $c^6$ in the same direction. When the bar $c^6$ is moved, as above, then the rollers $c^9$ move in the same direction in their inclined grooves, likewise the roller $c^{10}$ moves similarly in a reverse inclined groove of the bar $c^6$ and the cross head $c^{10}$, and causes the forward end of the bar $c^5$ to be thrust down, as shown in Fig. 4 and thus clamp the carbon. The releasing of the carbon occurs when the arm E starts on the return stroke, which throws bar $c^6$ to the right again and places the rollers into the deepest part of their grooves, thus allowing the spring $c^7$ (Fig. 8) to raise the bar $c^5$. The grooves of rollers $c^9$ are formed in the edges of the bars $c^6$ and $c^5$. When the carbon is released, it will fall by gravity into any suitable receptacle placed so as to catch it. The pushing gravity pawl $c^4$ is raised into operating position so as to assist in feeding the carbon between the knives, by the block $c$ striking against its lower side. (See Fig. 5.) The block also serves to raise the right hand end of the carrier a slight distance to free its carbon from the plates B and maintain it thus, until the arm E has reached its extreme left hand stroke where it engages a pin $c^4$ of the rod C' and again lowers the carrier between the plates B so as to allow the plates to form a trough for the reception of the succeeding carbon. The raising of the carrier C is accomplished when the arm E strikes the ledge $c^3$ of the rod C'. The rod C' lies to one side of the path of the arm E, which has movement in the slot $A^6$ of the base $A^2$ and the points $c^4$ and $c^3$ project into the path of the arm E. Hence they are moved by it.

In Figs. 9 and 12 inclusive, I show a modified knife which is of the straight reciprocating, rather than rotary type. Here I provide a frame J which upon its inner sides, has dove-tailed ways $j$, upon which knife holding blocks $j'$ are adapted to slide. A pair of these blocks hold one of the knives K. The knives K are long and one is provided upon each side of the passing carbon. The upper blocks $j'$ are united by a tie block $j^2$ which receives the end of the threaded shaft L. The shaft L passes loosely through the upper portion of the frame J, and immediately above it, passes in threaded relation through a toothed feeding wheel M, acting in the capacity of a nut. The side bars of the frame J just below the base $A^2$ are united by a yoke $j^3$ which serves to strengthen the frame and afford a bracket to secure the same to the base $A^2$. At the lower end, the side bars have a strap $J^2$ which is provided to hold these depending ends firmly together and guard against possible breakage.

In Fig. 10 the side bars are broken both at the top and bottom so as to allow a larger scale to be used in the drawings. The feeding wheel M serves to raise the knives through the rod L, intermittently in an upward direction, and when the knives have moved their full extent upward, they are lowered by moving the wheel M in a reverse direction by hand.

The means employed to actuate the feed wheel M are embodied in an extension to the standards $A^3$ $A^4$, as well as to the arm E. The extended standards form bearings, wherein a reciprocating rod N slides as it is moved near the end of each stroke of the arm E by reason of its coming into contact with rollers $n$ on such rod. The forward end of the rod N has a spring pawl $n'$ which engages the ratchet toothed wheel M, thus raising the screw threaded rod and the knives a short distance, to effect the presentation of a new knife edge to the subsequent carbon.

In Figs. 16, 17 and 18 are illustrated my modified carbon carrier, which as shown consists of an endless chain, composed of links V $v$ passing over wheels V' which may be connected to the shaft E' of the machine in any suitable manner. The links $v$ are made of two sections, between them at the ends, being pivoted the single sectional links V. The links are preferably about the length of one of the carbons, or reaching from the stop $v'$ to the end of the link.

The space between the two sections of the links $v$ affords ample space to hold the carbons from rolling off. To insure their remaining on the carrier, and to hold them steady as they pass through the knives $f$, I provide an upper roller $u^2$ and a lower chain supporting roll $u^3$. The chain carrier would simply displace the carrier C and the gripper bar $c^5$ is as previously described; and excepting the addition of the rollers $u^2$ and $u^3$, the mechanism in the main would remain the same, especially the feeding devices, &c.

The carbon carrier and carbon gripping device constitute the carbon feeding or conveying device, and are both capable of various modifications in their construction, the function of feeding or conveying the carbon between the cutters or knives remaining the same.

The foregoing description and accompanying drawings set forth in detail, mechanism embodying my invention; change may be made therein provided the principles of construction respectively recited in the following claims are employed.

I therefore particularly point out and distinctly claim as my invention—

1. In a carbon trimming machine, the combination of a carbon feeding device, with a trimmer arranged adjacent and at an acute angle to the path of said feeding device, substantially as set forth.

2. In a carbon trimming machine, the combination of a carbon carrier, a carbon gripping device, a trimmer located adjacent to the path of said carrier, and means to move the carrier into operative relation to the said trimmer, substantially as set forth.

3. In a carbon trimming machine, the combination with a carbon carrier, of an intermittently movable trimmer, adjacent to the path of said carrier, substantially as set forth.

4. In a carbon trimming machine, the combination of a carbon carrier, a carbon holder, carbon trimming mechanism located adjacent to the plane of movement of said carrier, and conjoint driving connections connected with said carrier and trimming mechanism, and adapted to operate the same at different intermitting periods, substantially as set forth.

5. In a carbon trimming machine, the combination of a reciprocating carbon carrier, a gravitating carbon stop, and an arm or block operatively connected with the said carrier to raise said stop, substantially as set forth.

6. In a carbon trimming machine, the combination of a reciprocating carbon carrier, a carbon stop upon said carrier, a carrier moving arm, and a carbon gripper upon the carrier and operatively connected with said arm, substantially as set forth.

7. In a carbon trimming machine, the combination of a carbon carrier, a carbon trimmer adjacent to the path of said carrier, a carrier moving arm, and a carbon gripping device connected to be operated by the same, substantially as set forth.

8. In a carbon trimming machine, the combination of a carbon carrier, a base for said carrier, a carrier moving arm, a trimmer and trimmer feeding mechanism operatively connected with said arm, substantially as set forth.

9. In a carbon trimming machine, the combination of radially pivoted arms, rotary trimming knives upon such arms, and oscillatory feeding mechanism adjacent to said knives and in operative relation thereto, substantially as set forth.

10. In a carbon trimming machine, the combination of pivoted knife-carrying arms, a base, a threaded bolt inserted through said arms and base, and yielding washers upon said bolt between said arms and base, substantially as set forth.

11. In a carbon trimming machine, the combination of a bed plate, supporting standards, a machine base upon the standards, a thrust rod in one of said standards, knife supporting arms pivoted upon said standard, and knife feeding mechanism upon said arms, and in operative relation to the thrust rod, substantially as set forth.

12. In a carbon trimming machine, the combination with a carbon carrier, a two membered gripping device and carrier actuating mechanism, one of the gripping members in operative relation to the carrier; said member being adapted to move the other member and hold the carbon upon the said carrier, substantially as set forth.

13. In a carbon trimming machine, the combination of a two sectioned carbon gripping device, provided with inclined contiguous slots in said sections and rollers in said slots, said rollers adapted to separate the sections as one or the other is moved, substantially as set forth.

14. In a carbon trimming machine, the combination of a knife bearing, a reciprocating thrust rod, connected, oscillating arms pivoted upon said bearing, one of said arms operative to move the knife, while the other is operated upon by said reciprocating thrust rod, substantially as set forth.

15. In a carbon trimming machine, the combination of trimming knives, oscillating arms and gripping mechanism adapted to rotate the knives as the said arms are intermittently moved, substantially as set forth.

16. In a carbon trimming machine, the combination of a carbon carrier, a carrier guide, a guide support, and adjustable connections intermediate of the guide support, substantially as set forth.

17. In a carbon trimming machine, the combination of a carbon carrier, a carrier guide, carrier actuating mechanism, and a rocking block operatively connected with the latter, said block being adapted to intermittently raise the carrier in said guide, substantially as set forth.

18. In a carbon trimming machine, the combination of a carbon carrier, standards upon said carrier adapted to guide the carrier in its reciprocations, a two membered gripper in such standards, contiguous to the said carrier, one of said members being pivoted, said standards being provided with slots to receive the gripper, separating rollers interposed between said members, and carrier actuating mechanism in operative relation to the loose member, substantially as set forth.

19. In a carbon trimming machine, the combination of a two membered gripper, cross-heads for said gripper, a pivotal bearing in one of said cross-heads for such gripper, and a yielding support in the other of said cross-heads for the gripper, substantially as set forth.

In testimony that I claim the foregoing to be my invention I have hereunto set my hand this 5th day of August, A. D. 1890.

CHARLES O. BARTLETT.

Witnesses:
   J. B. FAY,
   E. E. PATE.